Patented May 27, 1947

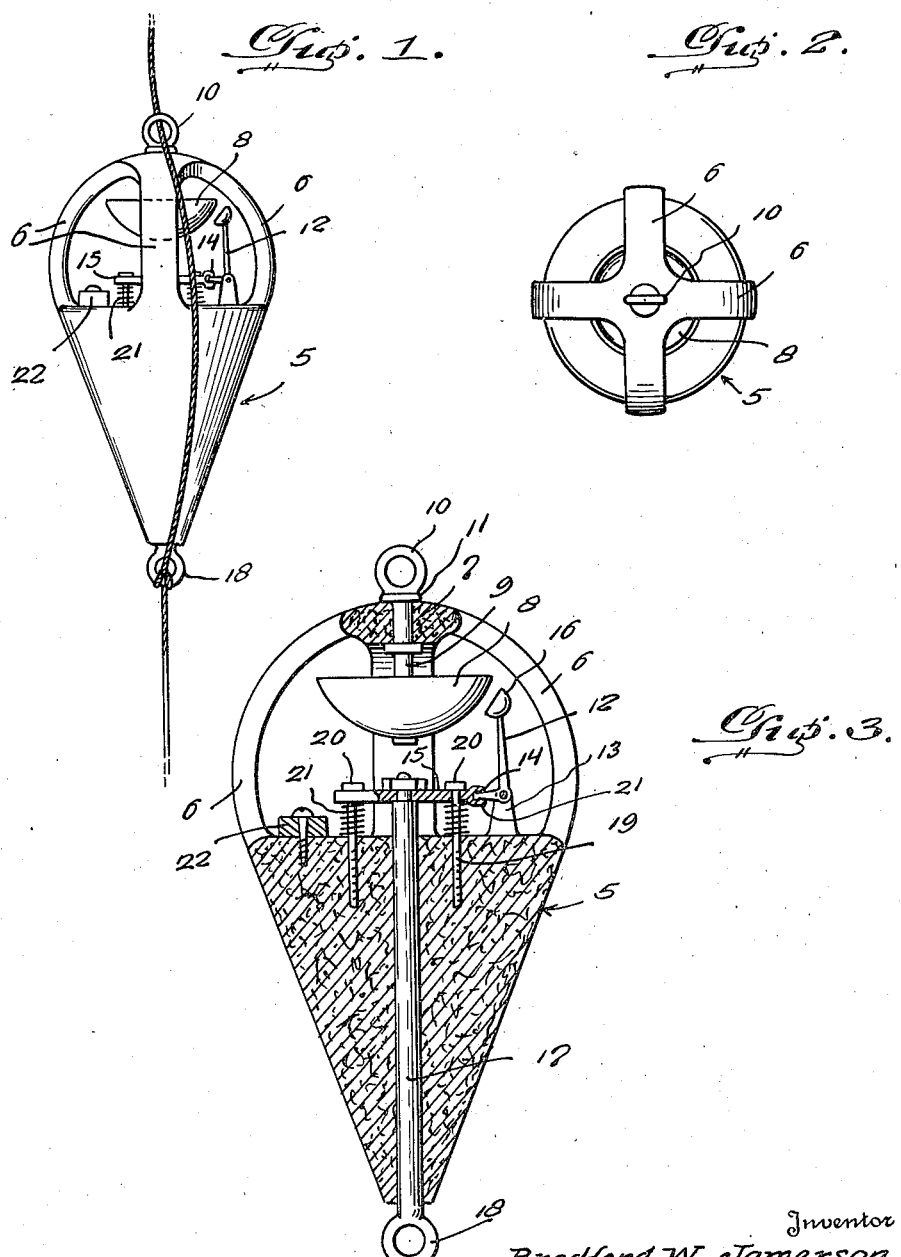

2,421,068

UNITED STATES PATENT OFFICE 2,421,068

FISHING LINE FLOAT

Bradford W. Jamerson, St. Louis, Mo.

Application July 18, 1944, Serial No. 545,444

3 Claims. (Cl. 43—17)

This invention relates to a fishing line float and has for the primary object, the provision of a device of this character which besides having all of the advantages of a conventionally constructed float will in addition thereto provide an audible signal automatically actuated by the fish grabbing the bait or becoming caught on the hook, so that the fisherman's attention will be attracted, rendering the device especially useful for night fishing when the float is not visible or it is not convenient or practical to illuminate the float with a flashlight or similar illuminating means.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a side elevation illustrating a fishing line float constructed in accordance with my invention;

Figure 2 is a top plan view illustrating the device;

Figure 3 is a view showing the body in vertical section.

Referring in detail to the drawing, the numeral 5 indicates the body of the float which is substantially conical shaped and constructed of cork or any other suitable material which will possess buoyancy. A part of the body 5 is cut away to provide arcuately curved portions 6 which connect with each other as at 7 and which also connect with the solid portion of the body 5 thereby providing one part of the body with a skeleton formation in which is located a bell 8 supported on a rod or member 9 terminating in an eye 10. The rod extends through an opening provided in the portion 7 of the body and has shoulders 11 thereon to abut said portion 7. A clapper 12 is pivotally mounted on the body as shown at 13 and has an off-set 14 integral with its pivot end received within a notch of an actuating plate 15. The clapper 12 on its free end is provided with the usual striker 16 positioned in close proximity to the bell 8.

The plate 15 is removably secured on a rod 17 slidably mounted in an opening provided in the solid portion of the body 5 and terminates in an eye 18. The solid portion of the body 5 has embedded therein guide pins 19 that extend through the plate 15 and are provided with heads 20 for limiting the upward movement of the plate 15 under the influence of coil springs 21 surrounding the pins 19 and interposed between the plate 15 and the solid portion of the body.

In adapting this device to a fishing line, the line is brought freely through the eye 10 and is suitably secured in the eye 18 with the portion of the line carrying the hook depending from the eye 18 so that whenever a fish takes the bait, on the hook or becomes caught on the hook, a pull is created on the rod 17 causing a movement of the plate 15 against the action of the springs 21. The downward movement of the plate 15 imparts pivotal movement to the clapper which in turn strikes the bell and makes the audible sound. This audible sound will attract the fisherman's attention.

A weight 22 is mounted on the solid portion of the body 5 opposite to the clapper 12 to off-set the weight of the latter.

While I have shown and described the preferred embodiment of my invention, it will be understood that minor changes in construction, combination and arrangement of parts may be made without departing from the spirit and scope of the invention as claimed.

Having thus described my invention, what I claim is:

1. A fishing line float comprising a buoyant body of inverted substantially cone-shape, floatable normally in a substantially upright position, having a raised open frame on its wide upper end, said frame including inturned spaced bars secured at their lower ends and meeting and secured together at their upper ends coaxially with respect to said buoyant body, an upstanding eye member located centrally on the place of meeting of said frame bars to receive a fishing line slidably and guidably therethrough, a sounding element supported within said open frame, a clapper element movably mounted within said open frame normally out of contact with said sounding element but actuatable to strike the same, a controlling and operating rod mounted longitudinally slidable in an axial bore in said buoyant body, said rod projecting at one end beyond the apex end of the body and provided with means for adjustably fastening the fishing line thereto, the opposite end of the rod having an operating connection with said clapper element, and spring means yieldably holding said controlling and operating rod and said clapper element in normal position, whereby, upon a pull of the fishing line in the direction away from the apex end of the buoyant body, the controlling and operating rod is accordingly pulled and the clapper element strikes the sounding element.

2. In a fishing line float, a buoyant body including a solid portion and a skeleton frame-like part, a bell mounted in the skeleton frame-like part and including an eye to receive a fishing line, a clapper for said bell pivotally mounted on the solid portion of the body, an operating rod slidably mounted in the solid portion of the body, and means connecting the clapper to the operating rod, the latter including an eye to have the fishing line connected thereto.

3. In a fishing line float, a buoyant body including a solid portion and a skeleton frame-like part, a bell mounted in the frame-like part, an eye to receive a fishing line, a clapper for the bell pivotally mounted on the solid portion of the body, an operating rod slidable in the solid portion of the body, and a spring influenced plate connected to the clapper and to the operating rod, said operating rod including an eye and having the fishing line connected thereto.

BRADFORD W. JAMERSON.

REFERENCES CITED

The following references are of record in the file of this patent:

UNITED STATES PATENTS

| Number | Name | Date |
|---|---|---|
| 980,667 | Owen | Jan. 3, 1911 |
| 467,123 | Kunzel | Jan. 12, 1892 |
| 987,354 | Gawenda et al. | Mar. 21, 1911 |
| 989,145 | Hatchett | Apr. 11, 1911 |
| 2,179,878 | Dietrich | Nov. 14, 1939 |
| 1,173,827 | Marsh | Feb. 29, 1916 |